(12) United States Patent
Huffman et al.

(10) Patent No.: US 8,635,640 B2
(45) Date of Patent: Jan. 21, 2014

(54) SYSTEM, METHOD AND COMPUTER PROGRAM PRODUCT FOR VERIFYING TRIGGERS IN A VIDEO DATA STREAM

(75) Inventors: James Huffman, Kansas City, MO (US); Jon D. Heath, Lees Summit, MO (US); Christopher R. Heck, Lees Summit, MO (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 776 days.

(21) Appl. No.: 12/343,878

(22) Filed: Dec. 24, 2008

(65) Prior Publication Data

US 2010/0162288 A1 Jun. 24, 2010

(51) Int. Cl.
*H04H 60/33* (2008.01)
*H04H 60/32* (2008.01)
*H04N 7/10* (2006.01)
*H04N 7/025* (2006.01)

(52) U.S. Cl.
USPC ........ 725/20; 725/9; 725/14; 725/19; 725/32; 725/34; 725/35

(58) Field of Classification Search
USPC .......................................................... 725/32
See application file for complete search history.

(56) References Cited

U.S. PATENT DOCUMENTS

| | | | |
|---|---|---|---|
| 5,481,294 A * | 1/1996 | Thomas et al. | 725/20 |
| 6,820,277 B1 | 11/2004 | Eldering et al. | |
| 2002/0059582 A1* | 5/2002 | Niklasson | 725/32 |
| 2002/0124246 A1* | 9/2002 | Kaminsky et al. | 725/9 |
| 2003/0221191 A1* | 11/2003 | Khusheim | 725/35 |
| 2005/0039205 A1 | 2/2005 | Riedl | |
| 2005/0169314 A1* | 8/2005 | Beaudoin et al. | 370/480 |
| 2005/0262539 A1* | 11/2005 | Barton et al. | 725/90 |
| 2006/0277569 A1* | 12/2006 | Smith | 725/35 |
| 2007/0055983 A1 | 3/2007 | Schiller et al. | |
| 2007/0162927 A1* | 7/2007 | Ramaswamy et al. | 725/36 |
| 2007/0240602 A1 | 10/2007 | Dion et al. | |
| 2008/0046917 A1* | 2/2008 | de Heer | 725/32 |
| 2008/0201736 A1 | 8/2008 | Gordon et al. | |
| 2009/0070837 A1* | 3/2009 | Jacobs | 725/104 |

* cited by examiner

*Primary Examiner* — Justin Shepard
(74) *Attorney, Agent, or Firm* — G. Michael Roebuck

(57) ABSTRACT

A method is disclosed for logging triggers in a video data stream the method including but not limited to monitoring a video data stream at an multimedia processor end user device; receiving from a data distribution server, the video data stream at the multimedia processor end user device; detecting a trigger in the video data stream at the multimedia processor end user device; logging a time for the trigger detected in the video data stream in a trigger log at the multimedia processor end user device; and sending the trigger log an advertising verification system in the data distribution system for correlating the time the trigger occurred with an Advertising Schedule.

6 Claims, 6 Drawing Sheets

SYSTEM, METHOD AND COMPUTER PROGRAM PRODUCT FOR VERIFYING TRIGGERS IN A VIDEO DATA STREAM

FIELD OF THE DISCLOSURE

The present disclosure relates to the field of advertising and in particular to the verification of advertising delivery in a data distribution system.

BACKGROUND OF THE DISCLOSURE

Advertiser purchase advertisement space or spots in television programs. The television broadcast stations make up a schedule of advertisements and the programs in which the advertisements are to appear. In the past, advertisers used their personnel to watch tapes of broadcast television to physically review the tapes and verify that the advertisers' scheduled advertisements were broadcast in the various markets for which the advertisements were intended. The increase in television channels and networks has made physical review of broadcast tapes more difficult.

DETAILED DESCRIPTION

Figure 1:
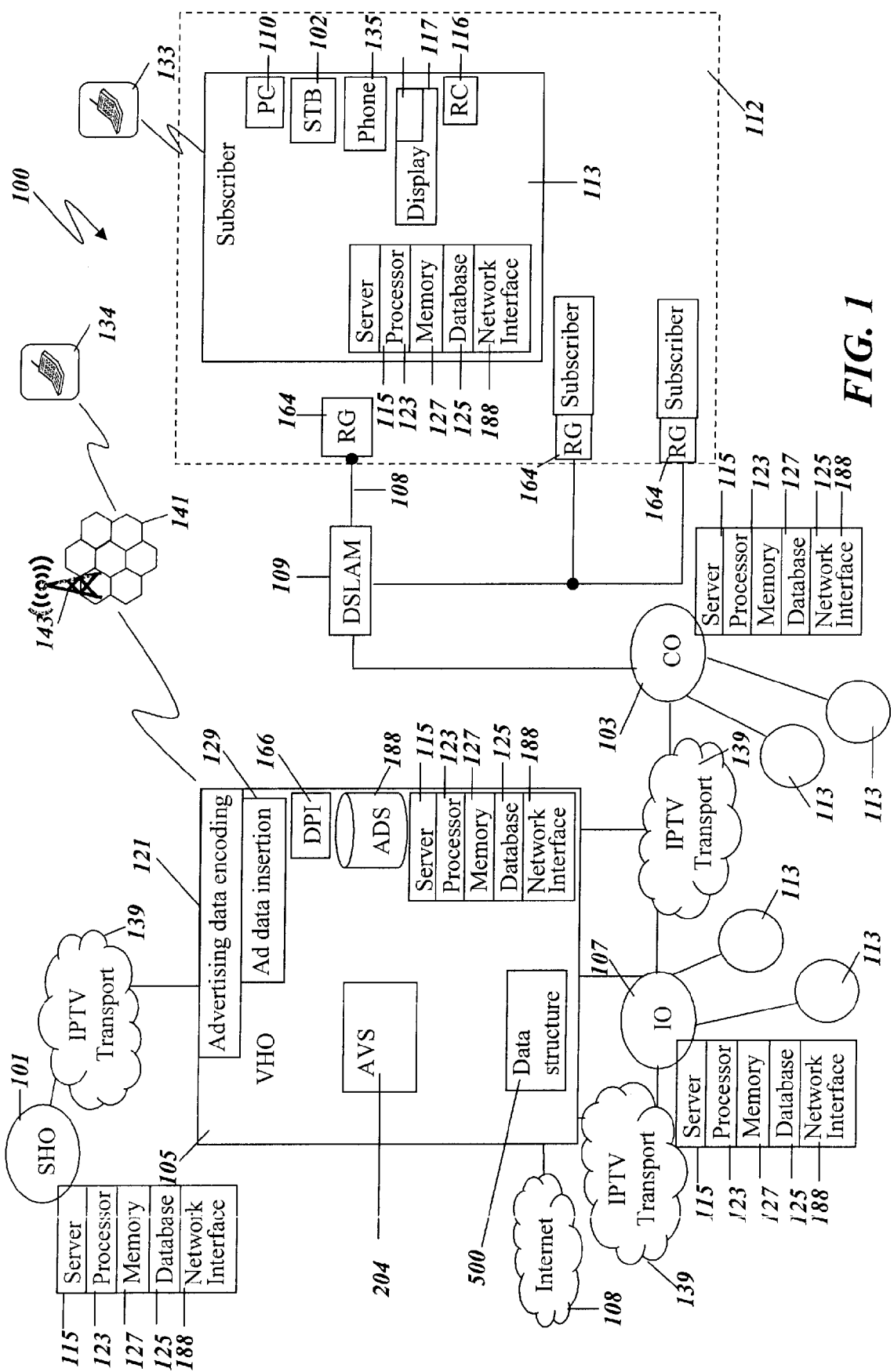
FIG. 1 depicts an illustrative embodiment of a system for delivering video and advertising data.

In an illustrative embodiment advertising triggers are inserted into a video data stream to signal when advertising should be inserted into the video data stream. The advertising triggers may be a Society for Cable Television Engineers (SCTE) 104 trigger, a SCTE 35 or a SCTE 30 trigger. The specifications for these triggers are discussed at length in the SCTE 35 American National Standards Institute (ANSI) standard, the SCTE 30 ANSI standard and the SCTE 104 ANSI standards, all of which ANSI standards are hereby incorporated by reference herein. In a particular illustrative embodiment, a SCTE trigger is embedded in the vertical ancillary data (VANC) data of an ASI, SDI or HDSDI video data stream. In another embodiment, the SCTE trigger appears within the first 20 lines of data. The trigger is detected and logged in a trigger log. In another embodiment an advertising identifier is associated with the advertising data. The advertising identifier is a unique identifier given to the advertising data when it is accepted into the data distribution system for dissemination. The data distribution network, such as an internet protocol television (IPTV) network sends video data streams to end user devices which receive, decode and display the video data for viewing by network subscribers.

The present example is a particular illustrative embodiment which uses and IPTV network as an example of implementation. Other illustrative embodiments may employ different data distribution networks such as cable television networks, satellite networks or the Internet. In the present illustrative embodiment, advertising triggers are detected and logged at various network levels in the hierarchically arranged set of servers in the IPTV network as well as at the end user device. The trigger logs for each of the servers are and the trigger logs for the end user device are compared to the Advertising Schedule associated with the network level at which the trigger logs is created including the end user device. Thus a national Advertising Schedule for advertisements disseminated from the IPTV network at the national network level to all end user devices is compared to a trigger log from a sampling of end user devices that received a particular advertisement in the national network Advertising Schedule to verify that the end user device received a trigger for the national advertisement.

A regional Advertising Schedule for advertisements disseminated from the IPTV network at the regional network level to regional end user devices is compared to a trigger log from a sampling of end user devices that received a particular advertisement in the regional network Advertising Schedule to verify that the end user device received a trigger for the regional advertisement. A targeted Advertising Schedule for advertisements disseminated from the IPTV network at the local or regional network level to a set of targeted end user devices is compared to a trigger log from a sampling of targeted end user devices that received a particular advertisement in the targeted network Advertising Schedule to verify that the end user device received a trigger for the targeted advertisement.

In another embodiment, an advertising identifier is inserted into the video data stream along with the trigger to identify the advertisement which is to be inserted or has been inserted into the video data stream. Thus an advertising insertion device can detect the trigger and insert the identified advertisement into the video data stream or identify the advertisement already inserted into the video data stream. An indicator can be included to signal the advertising insertion device whether or not to insert the advertisement or whether it has already been inserted. The advertising insertion device then logs the occurrence of the trigger, the time of the occurrence and the identifier for the advertisement into an As Run Log. The various network levels in the IPTV network including the end user device (STB) generate both a trigger log and an As Run Log.

In another embodiment, a national Advertising Schedule for advertisements disseminated from the IPTV network at the national network level to all end user devices is compared to an As Run Log from a sampling of end user devices that were scheduled received a particular advertisement in the national network Advertising Schedule to verify that the end user device received the particular national advertisement. In another embodiment, a regional Advertising Schedule for advertisements disseminated from the IPTV network at the regional network level to regional end user devices is compared to an As Run Log from a sampling of end user devices that were scheduled received a particular advertisement in the regional network Advertising Schedule to verify that the end user device received the particular regional advertisement.

In another embodiment, a targeted Advertising Schedule for advertisements disseminated from the IPTV network at the local or regional level to one or more targeted end user devices is compared to an As Run Log from a sampling of end user devices that were scheduled to receive a particular advertisement in the targeted Advertising Schedule to verify that the end user device received the particular targeted advertisement.

In a particular illustrative embodiment, a SCTE trigger is embedded in the vertical ancillary data (VANC) data of an asynchronous serial interface (ASI), serial digital interface (SDI) or high definition SDI (HDSDI) video data stream. The Serial Digital Interface (SDI), standardized in ITU-R BT.656 and SMPTE 259M, is a digital video interface used for broadcast-grade video. For standard definition applications, as defined by SMPTE 259M, some of the possible bit rates are 270 Mbps, 360 Mbps, 143 Mbps, and 177 Mbps. 270 Mbps is by far the most commonly used; though the 360 Mbps interface (used for widescreen standard definition) is sometimes encountered. DVB-ASI (Digital Video Broadcasting—Asynchronous Serial Interface) is frequently used in satellite transmission, interfacility links, and telephony communications. DVB-ASI is designed to transport MPEG-2 video streams, primarily for television applications, at up to 270 Mbps. The electrical implementation of DVB-ASI is similar to serial digital interface (SDI). DVB-ASI is carried at a 270 Mbps line rate consistent with the SDI clock described in SMPTE 259M.

In another embodiment, the SCTE trigger appears within the first 20 lines of data. The trigger is detected and logged in a trigger log. In another embodiment an advertising identifier is associated with the advertising data. The advertising identifier is a unique identifier given to the advertising data when it is accepted into the data distribution system for dissemination. The data distribution network, such as an internet protocol television (IPTV) network sends video data streams to end user devices which receive, decode and display the video data for viewing by network subscribers.

The present example is a particular illustrative embodiment which uses an IPTV network as an example of implementation. Other illustrative embodiments may employ different data distribution networks such as cable television networks, satellite networks or the Internet. In the present illustrative embodiment, advertising triggers are detected and logged at various network levels in the hierarchically arranged set of servers in the IPTV network as well as at the end user device. The trigger logs for each of the servers and the trigger logs for the end user device are compared to the Advertising Schedule associated with the network level at which the trigger log was created including the end user device. Thus a national Advertising Schedule for advertisements disseminated from the IPTV network at the national network level to all end user devices is compared to a trigger log from a sampling of end user devices that received a particular advertisement in the national network Advertising Schedule to verify that the end user device received a trigger for the national advertisement.

A regional Advertising Schedule for advertisements disseminated from the IPTV network at the regional network level to regional end user devices is compared to a trigger log from a sampling of end user devices that received a particular advertisement in the regional network Advertising Schedule to verify that the end user device received a trigger for the regional advertisement. A targeted Advertising Schedule for advertisements disseminated from the IPTV network at the local or regional network level to a set of targeted end user devices is compared to a trigger log from a sampling of targeted end user devices that received a particular advertisement in the targeted network Advertising Schedule to verify that the end user device received a trigger for the targeted advertisement.

In another embodiment, an advertising identifier is inserted into the video data stream along with the trigger to identify the advertisement which is to be inserted or has been inserted into the video data stream. Thus, an advertising insertion device can detect the trigger and insert the identified advertisement into the video data stream or identify the advertisement already inserted into the video data stream. An indicator can be included to signal the advertising insertion device whether or not to insert the advertisement or whether it has already been inserted. The advertising insertion device then logs the occurrence of the trigger, the time of the occurrence and the identifier for the advertisement into an As Run log. The various network levels in the IPTV network including the end user device (STB) generate both a trigger log and an As Run Log.

In an illustrative embodiment an Industry Standard Commercial Identifier (ISCI) code is used as the advertising identifier. An ISCI code conforms to a standard used to identify commercials (aka "spots") aired on commercial television worldwide, for TV stations, ad agencies, video post-production houses, radio stations and other related entities to identify commercials for airing. It was first developed in 1970 by and for American local affiliate TV stations, the TV networks that serve the affiliates, and ad agencies, to distribute commercial television advertisements more efficiently. The ISCI coding system has been maintained and operated by the American Association of Advertising Agencies (AAAA) and the Association of National Advertisers (ANA) since 1992. Prior to then, ISCI was independently maintained by its users.

An ISCI code is usually a set of 8 characters, the first four being alphabetic, and the remaining four being numeric, in the format 'ABCD1234'. The alphabetical characters usually represent the advertiser (some examples are QWAN for Wells Fargo Bank™, KOCL (and more recently CL) for Coca-Cola™, and PEMX for Pepsi™), and the numeric characters usually represent the spot itself, with different numbers used for either different spots, or different versions of the same spot. For example, a 30 second spot might have a code of XECA1263, while the same commercial in a shortened :20 or :15 version (or in a different language such as Spanish) might have a slightly different code of XECA1264. The ISCI code is unique to each individual commercial. The slightest change to an ad will lead to the use of another code. In some cases where a spot is updated or changed, or subject to change the suffix R followed by a number indicates a revision. For example, YHTX6265 would be the ISCI used by Home Depot™ for a garden product. If the price changed and the ad was the same otherwise, YHTX6265R1 may be used to indicate that it is the first revision of that spot. ISCI codes are usually printed on the video cassette label of a commercial.

An Advertising Schedule is used to indicate advertisements and the programs and times within the programs into which they are to be inserted. The Advertising Schedule is divided into hierarchical segments for national, regional, local and targeted advertisements. Some or all of the national, regional, local and targeted advertisement schedules are compared to hierarchical national, regional, local and targeted advertisement trigger logs to verify that a trigger was received and logged for particular advertisements scheduled in the national, regional, local and targeted advertisement schedules. Each of the national, regional, local and targeted advertisement schedules are compared to hierarchical national, regional, local and targeted advertisement As Run logs to verify that a particular advertisement was received and logged for each advertisement in each of the national, regional, local and targeted advertisement schedules.

In another embodiment, a national Advertising Schedule for advertisements disseminated from the IPTV network at the national network level to all end user devices is compared to an As Run log from a sampling of end user devices that were scheduled to receive a particular advertisement in the national network Advertising Schedule to verify that the end user device received the particular national advertisement. In another embodiment, a regional Advertising Schedule for advertisements disseminated from the IPTV network at the regional network level to regional end user devices is compared to an As Run log from a sampling of end user devices that were scheduled to receive a particular advertisement in the regional network Advertising Schedule to verify that the end user device received the particular regional advertisement.

In another embodiment, a targeted Advertising Schedule for advertisements disseminated from the IPTV network at the local or regional level to one or more targeted end user devices is compared to an As Run log from a sampling of end user devices that were scheduled to receive a particular advertisement in the targeted Advertising Schedule to verify that the end user device received the particular targeted advertisement. The end user device, in the present example is a multimedia processor end user device set top box. Multimedia processor end user devices are capable of receiving a video data stream including audio and presenting the video and audio as a displayed and audio presentation at the multimedia processor end user device or a peripheral device in data communication with the multimedia processor end user device. The multimedia processor end user device may also be selected from a group of devices including but not limited to a cell phone, portable computer, personal data assistant, personal computer or personal media player.

In another embodiment, a first method is disclosed for logging triggers in a video data stream the method including but not limited to monitoring a video data stream at a multimedia processor end user device; receiving from a data distribution server, the video data stream at the multimedia processor end user device; detecting a trigger in the video data stream at the multimedia processor end user device; logging a time for the trigger detected in the video data stream in a trigger log at the multimedia processor end user device; and sending the trigger log including information to an advertising verification system so that the advertising verification system can correlate the time the trigger occurred with an advertising schedule. In another embodiment of the first method, the detecting further comprises scanning the first 20 lines of video data stream for the trigger.

In another embodiment of the first method, the method further includes but is not limited to reading at the multimedia processor end user device, an advertising identifier in the video data stream associated with the trigger detected from the video data stream, the advertising identifier indicating particular advertising data inserted into the video data stream by an advertising insertion device in the data distribution system; logging the advertising identifier with the trigger detected and time of day in an as run log at the end user device; and sending the as run log to the data distribution system server. In another embodiment of the method, the trigger is a Society for Cable Television Engineers (SCTE) 104 trigger and the video data stream is a SDI video data stream. In another embodiment of the first method, the trigger is a SCTE 35 trigger and the video data stream is an ASI video data stream. In another embodiment of the first method, the advertising identifier is an international standard code identifier (ISCI) code assigned to the advertising data and inserted into the video data stream in the data distribution system server.

In another embodiment a second method is disclosed for logging triggers in a video data stream the second method including but not limited to monitoring a video data stream at a server in a data distribution system; detecting a trigger in the video data stream at a trigger detection device at the server; logging in a trigger log at the server a time for the trigger detected in the video data stream; and sending the trigger log including information to an advertising verification system so that the advertising verification system can correlate the time the trigger occurred with an advertising schedule. In another embodiment of the second method, the second method further includes but is not limited to receiving at the server, a trigger log from a multimedia processor end user device, wherein the correlating further comprises comparing the advertising schedule to an as run log created by a network advertising insertion device in the data distribution system, to the trigger log at the server, to the trigger log received from the multimedia processor end user device and to verify that a trigger was received at the advertising insertion device at the server and at the trigger detection device at the server and at the trigger detection device at the multimedia end user device for advertising in the advertising schedule, wherein the as run log contains data indicate particular advertising data inserted by the advertising insertion device in the data distribution system.

In another embodiment of the second method, the second method further includes but is not limited to receiving an as run log at the server from the multimedia processor end user device, wherein the as run log contains data indicating particular advertising data received at the multimedia processor end user device and wherein the correlating further comprises comparing the as run log received from the multimedia processor end user device and an advertising schedule to verify that a particular advertisement was received at the advertising detection device in the multimedia processor end user device and the trigger detection device in the multimedia processor end user device for a particular advertisement in the advertising schedule. In another embodiment of the second method, the correlating further comprises comparing an as run log created by advertising insertion device in the data distribution system to an advertising schedule to verify that an advertisement identified in the advertising schedule was received at the advertising insertion device at the server for all advertising in the advertising in the advertising schedule, wherein the as run log contains data indicating particular advertising data received at the advertising insertion device.

In another embodiment of the second method, the correlating further comprises comparing an as run log created by a targeted advertising insertion device at the set top box to a targeted Advertising Schedule in a data distribution system server to verify that a particular targeted advertisement identified in a targeted advertising schedule was received at the multimedia processor end user device.

In another embodiment a first computer readable medium is disclosed containing a computer program embedded in the computer readable medium, the computer program comprising instructions to monitor a video data stream at an multimedia processor end user device; instructions to receive from a data distribution server, the video data stream at the multimedia processor end user device; instructions to detect a trigger in the video data stream at the multimedia processor end user device; instructions to read at the multimedia processor end user device, an advertising identifier in the video data stream associated with the trigger detected from the video data stream, the advertising identifier indicating particular advertising data inserted into the video data stream by an advertising insertion device in the data distribution system; instructions to log the advertising identifier with the trigger detected and time of day for the trigger detected in an as run log at the end user device; and instructions to send the as run log to the data distribution system server.

In another embodiment a first computer readable medium is disclosed comprising instructions embedded therein for logging triggers in a video data stream the computer program comprising instructions to monitoring a video data stream at a server in a data distribution system; instructions to detect a trigger in the video data stream at a trigger detection device at the server; instructions to log in a trigger log at the server a time for the trigger detected in the video data stream; instructions to send the trigger log including information to an advertising verification system so that the advertising verification system can correlate the time the trigger occurred with an advertising schedule data, instructions to receive at the server, a trigger log from a multimedia processor end user device, wherein the correlating further comprises comparing an advertising schedule to an as run log created by network advertising insertion device in the data distribution system, wherein the as run log contains data indicating particular advertising data inserted by the advertising insertion device in the data distribution system, to the trigger log at the server, to the trigger log received from the multimedia processor end user device and to an advertising schedule to verify that a trigger was received at the advertising insertion device at the server and at the trigger detection device in the data distribution system and at the trigger detection device at the multimedia end user device for advertising in the advertising schedule; instructions to receive an as run log at the server from the multimedia processor end user device, wherein the as run log contains data indicating particular advertising data received at the multimedia processor end user device and instructions to compare the as run log received from the multimedia processor end user device and an advertising schedule to verify that a particular advertisement was received at the advertising detection device in the multimedia processor end user device and the trigger detection device in the multimedia processor end user device for a particular advertisement in the advertising schedule.

In another embodiment a first system is disclosed for verifying triggers in a video data stream the system including but not limited to a processor in data communication with a computer readable medium in a multimedia processor end user device; a trigger log detector for scanning video data for a trigger in the video data stream at the multimedia processor end user device; a trigger log for containing a time for the trigger detected in the video data stream in a trigger log data base at the multimedia processor end user device; and a first processor interface for sending the trigger log to an advertising verification system in the data distribution system for correlating the time the trigger occurred with an advertising schedule. In another illustrative embodiment of the first system, the first system further includes but is not limited to an advertising insertion device for reading at the multimedia processor end user device, an advertising identifier in the video data stream associated with the trigger detected from the video data stream, the advertising identifier indicating particular advertising data inserted into the video data stream by an advertising insertion device in the data distribution system; an as run log for storing the advertising identifier with the trigger detected and time of day in an as run data base at the end user device; and a second processor interface for sending the as run log to the data distribution system server.

In another embodiment a second system is disclosed for verifying triggers in a video data stream the system including a server processor in data communication with a computer readable medium; a trigger log detector configured to scan video data in the video data stream for and detect a trigger in the video data stream at the server; a trigger log to store data in a data base at the server, the data indicating a time for the trigger detected in the video data stream; and an advertising verification system configured to receive the trigger log so that the advertising verification system can correlate the time that the trigger occurred with as advertising schedule data. In another embodiment of the second system, the advertising verification system is configured to receive the trigger log from a multimedia processor end user device and compare an advertising schedule to an as run log created by network advertising insertion device in the data distribution system to the trigger log data base at the server to the trigger log data base received from the multimedia processor end user device and to an advertising schedule to verify that a trigger was received at the advertising insertion device at the server and at the trigger detection device in the data distribution system and at the trigger detection device at the multimedia end user device for advertising in the advertising schedule, wherein the as run log contains data indicating particular advertising data inserted by the advertising insertion device in the data distribution system.

In another embodiment of the second system the advertising verification system is configured to receive an as run log at the server from the multimedia processor end user device, wherein the as run log contains data indicating particular advertising data received at the multimedia processor end user device and wherein the advertising verification system is configured to compare the as run log received from the multimedia processor end user device and an advertising schedule to verify that a particular advertisement was received at the advertising detection device in the multimedia processor end user device and the trigger detection device in the multimedia processor end user device for a particular advertisement in the advertising schedule.

In another embodiment of the second system the advertising verification system is configured to compare an as run log created by advertising insertion device in the data distribution system to an advertising schedule to verify that an advertisement identified in the advertising schedule was received at the advertising insertion device at the server for all advertising in the advertising in the advertising schedule, wherein the as run log contains data indicating particular advertising data received at the advertising insertion device In another embodiment of the second system the advertising verification system is configured to compare an as run log created by a targeted advertising insertion device at the set top box to a targeted advertising schedule in a data distribution system server to verify that a particular targeted advertisement identified in a targeted advertising schedule was received at the multimedia processor end user device.

In another illustrative embodiment an advertising verification system is disclosed for verifying triggers in a video data stream the system including but not limited to a server processor in data communication with a computer readable medium; and an advertising verification system component configured in the server processor that receives trigger log data so that the advertising verification system can correlate the time that the trigger occurred with an advertising schedule data. In another illustrative embodiment of the advertising verification system the advertising verification system is configured to receive the trigger log from a multimedia processor end user device and compare an advertising schedule to an as run log created by network advertising insertion device in the data distribution system to the trigger log data base at the server to the trigger log data base received from the multimedia processor end user device and to an advertising schedule to verify that a trigger was received at the advertising insertion device at the server and at the trigger detection device in the data distribution system and at the trigger detection device at the multimedia end user device for advertising in the advertising schedule, wherein the as run log contains data indicating particular advertising data inserted by the advertising insertion device in the data distribution system.

Turning now to FIG. 1, an illustrative embodiment of an IPTV system 100 is depicted. In an illustrative IPTV system, 100 delivers video data including but not limited to video data content and advertising data to subscriber households 113 and associated multimedia processor end user devices (also referred to herein as subscriber or client devices) which may be inside or outside of the household. The video data further includes but is not limited to ASI video streams, SDI video streams and HDSDI video streams.

In the IPTV system, IPTV channels are first broadcast in an internet protocol (IP) from a server at a super hub office (SHO) 101 (national level) to an IPTV video hub office (VHO) server 103 (regional level), to an intermediate office (IO) server 107 (local level) and to a central office (CO) 103 (individual targeted level). The IPTV system provides ASI, SDI and HD SDI video data to the multimedia processor end user devices. The IPTV system 100 includes a hierarchically arranged network of servers wherein a particular embodiment the SHO transmits video and advertising data to a video hub office (VHO) 103 and the VHO transmits to another server location closer to an end user device/subscriber, such as a CO server 103 or IO 107. In another particular embodiment, each of the SHO, VHO, CO and IO are interconnected with an IPTV transport 139. The IPTV transport 139 may consist of high speed fiber optic cables interconnected with routers for transmission of internet protocol data. The IPTV servers also provide data communication for Internet and VoIP services to subscribers.

Actively viewed IPTV channels data are sent in an Internet protocol (IP) data multicast group to access nodes such as digital subscriber line access multiplexer (DSLAM) 109. A multicast for a particular IPTV channel is joined by the set-top boxes (STBs) at IPTV subscriber homes from the DSLAM. Each SHO, VHO, CO, IO and STB includes a server 115, processor 123, a memory 127, network interface 188 and a database 125. The network interface functions to send and receive data over the IPTV transport. The CO server delivers IPTV, Internet and VoIP content to the subscriber via the IO and DSLAM. The television content is delivered via multicast and television advertising data via unicast or multicast depending on a target television advertising group of end user client subscriber devices to which the advertising data is directed. The IPTV network keeps track of which stream are being sent to each STB at the national, regional, local and individual targeted level at the VHO, RHO, IO and CO respectively.

In another particular embodiment, client devices, also referred to herein as multimedia processor end user devices, are different stationary and mobile devices, including but not limited to, wire line phones 135, portable phones 133, lap top computers 118, personal computers (PC) 110 and STBs 102, 119 which communicate with the data distribution network i.e., IPTV network through residential gateway (RG) 164 and high speed communication lines such as IPTV transport 139. In another particular embodiment, DPI devices 166 inspect data VoIP, Internet data and IPTV video, commands and Meta data (multicast and unicast) between the subscriber devices and the IPTV system severs.

In another particular embodiment, the end user devices or subscriber devices include but are not limited to a client user computer, a personal computer (PC) 110, a tablet PC, a set-top box (STB) 102, a Personal Digital Assistant (PDA), a cellular telephone 134, a mobile device 134, a palmtop computer 134, a laptop computer 110, a desktop computer, a communications device, a wireless telephone, a land-line telephone, a control system, a camera, a scanner, a facsimile machine, a printer, a pager, a personal trusted device, a web appliance, a network router, switch or bridge or any machine capable of executing a set of instructions (sequential or otherwise) that specify actions to be taken by that machine. In another particular embodiment, a deep packet inspection (DPI) device 124 inspects multicast and unicast data, including but not limited to VoIP data, Internet data and IPTV video, commands and Meta data between the subscriber devices and between subscriber devices and the IPTV system severs.

As shown in FIG. 1 STB groups 112 (comprising a group of subscriber house holds 113) receive multicast and unicast advertising data in video data streams from IO server 107 via CO 103 and DSLAM 109 at STB 102. In another particular embodiment, each STB is configured to perform DVR functionality using memory, processor and data base on board the STB. Individual households 113 receive video data at set top box 102 or one of the other client devices. More than one STB (see STB1 102 and STB2 119) can be located in an individual household 113 and each individual STB can receive a separate multicast or unicast video stream on IPTV transport 139 through DSLAM 109. In another particular illustrative embodiment separate and unique advertising data are displayed at each set top box (STB) 102, 119 tailored to target the particular subscriber watching television at that particular STB. Each STB 102, 119 have an associated remote control (RC) 116 and video display 117. The subscriber via the RC selects channels for a video data viewing selection (video programs, games, movies, video on demand), initiates trick play commands data to the STB/DVR and places orders for products and services over the IPTV system 100. In a particular embodiment, an advertisement verification system (AVS) 204 runs on the server processor 123.

Figure 2:
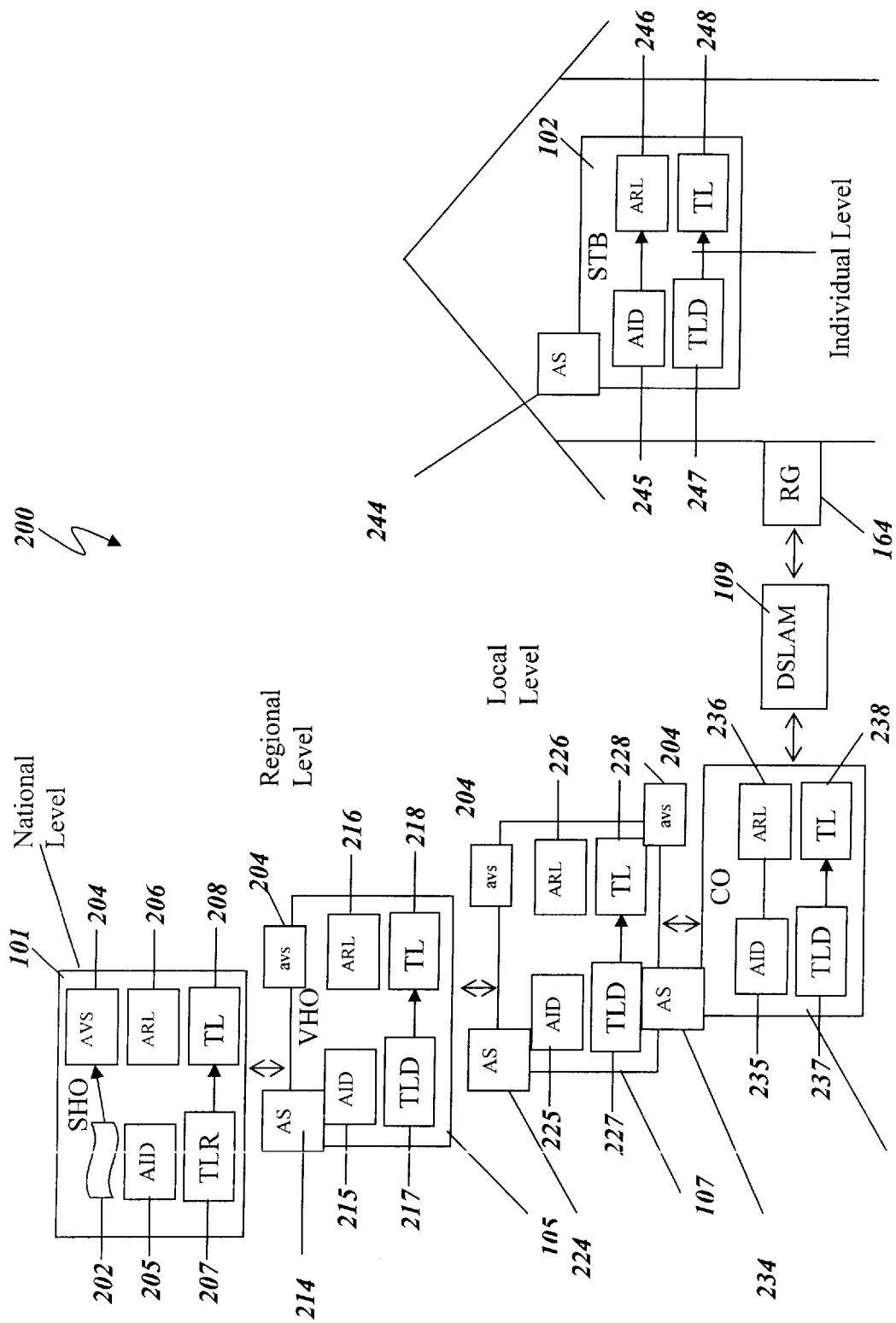
FIG. 2 depicts an illustrative embodiment of a system for logging and verifying triggers.

Turning now to FIG. 2, as shown in FIG. 2, each hierarchical IPTV network level as well as the end user level include but are not limited to an Advertising Insertion Device (AID) which functions to detect advertisement identifiers in a particular video data stream associated with advertising triggers in the particular video data stream and log the advertisement identifier, time of day and video stream identifier in an As Run Log (ARL). Each hierarchical IPTV network level as well as the end user level include but are not limited to a Trigger Logging Device (TLD) which functions to detect and log advertising triggers in a particular video data stream associated and log the advertising trigger, time of day and video stream identifier in a Trigger Log (TL). Thus triggers and advertisements are monitored and logged in an ARL and TL at each hierarchical level in the IPTV network, national, regional, local and individual targeted as well as at the STB. Processor and computer readable media and data bases are provided at each level of the IPTV network including the STB as shown in FIG. 1. The AID and TLD operate as individual devices at each hierarchical level of the IPTV network and at the STB. In another embodiment, the AID and TLD operate in processors at each hierarchical level of the IPTV network and at the STB. The ARL and TL are stored in a computer readable medium at each hierarchical level of the IPTV network and at the STB.

As shown in FIG. 2, the SHO includes but is not limited to an AVS 204, AID 205, ARL 206, TLD 207 and TL 208. At the SHO, the TLD logs triggers as they occur in the TL storing the time of day, video stream identifier and a TLD identifier for use later in the AVS for verifying that a trigger was sent for a particular advertisement at a particular IPTV network level or multimedia processor end user device. The VHO includes but is not limited to an AID 215, ARL 216, TLD 217 and TL 218. At the VHO, the TLD logs the triggers as they occur in the TL storing the time of day, video stream identifier and a TLD identifier for use later in the AVS for verifying that a trigger was sent for a particular advertisement at a particular IPTV network level or multimedia processor end user device.

The IO includes but is not limited to an AID 225, ARL 226, TLD 227 and TL 228. At the IO, the TLD logs triggers as they occur in the TL storing the time of day, video stream identifier and a TLD identifier for use later in verifying trigger were sent for a particular advertisement at a particular IPTV network level or multimedia processor end user device. The CO includes but is not limited to an AID 235, ARL 236, TLD 237 and TL 238. At the CO, the TLD logs triggers as they occur in the TL storing the time of day, video stream identifier and a TLD identifier for use later in verifying trigger were sent for a particular advertisement at a particular IPTV network level or multimedia processor end user device. The STB includes but is not limited to an AID 245, ARL 246, TLD 247 and TL 248. At the STB, the TLD logs triggers as they occur in the TL storing the time of day, video stream identifier and a TLD identifier for use later in verifying trigger were sent for a particular advertisement at a particular IPTV network level or multimedia processor end user device. In another embodiment, an AVS is provided at each of the SHO, VHO, IO and CO.

An Advertisement Schedule including but not limited to advertisement identifiers, program placement identifiers, program placement stream identifiers and time of day is stored at the SHO and used by the AID at the SHO to insert advertising data, advertising triggers and advertising identifiers into the video data stream which is then sent to the VHO at next lower hierarchical network level in the IPTV network. The Advertisement Schedule (AS) is later compared in an AVS to TLs at each IPTV network level including the individual level at STBs to verify that the triggers were received. In another embodiment the Advertisement Schedule is later compared to ARLs in an AVS at each IPTV network level including the individual level at STBs to verify that the advertisements in the AS were received. The AS, ARL and TL are stored in data structure embedded in a computer readable medium for the particular hierarchical level for which the AS, ARL or TL is generated (National, Regional, Local, Targeted Individual and STB).

Each TL includes but is not limited to a trigger time of day, video stream identifier and a trigger log identifier which identifies the network level (National, Regional, Local and Targeted Individual) and entity (identifier within the network level, STB ID, CO ID, etc.) that generates a particular AS, ARL or TL. The ARL and TL are reported up stream in the IPTV network through each hierarchical level of the network from the STB up to the SHO. In a particular embodiment, an AS is created at hierarchical network level and the STB, and each AS is compared in an AVS to the ARL and TL for each level in the IPTV network and end user device to verify that triggers and advertisements were received for each advertisement identifier, program placement identifier, program placement stream identifier and time of day in the AS. An AS can be generated at any level of the IPTV network for advertisements designated for those end user device served by the network level. Thus a national AS would be used for the SHO, a regional AS for the VHO, a local AS for the IO and an individual targeted or small group targeted AS at the CO. A targeted AS is generated when an advertisement is intended for less than all end users served by a particular hierarchical level in the IPTV network. Thus a targeted AS can be generated at the National (SHO) 202, Regional 214 (VHO), Local 224 (IO) or Targeted Individual/Small Group level 234 (CO) or STB 244. In a particular embodiment, the STB AS is for advertisements sent from a first STB to a second STB.

Figure 3:
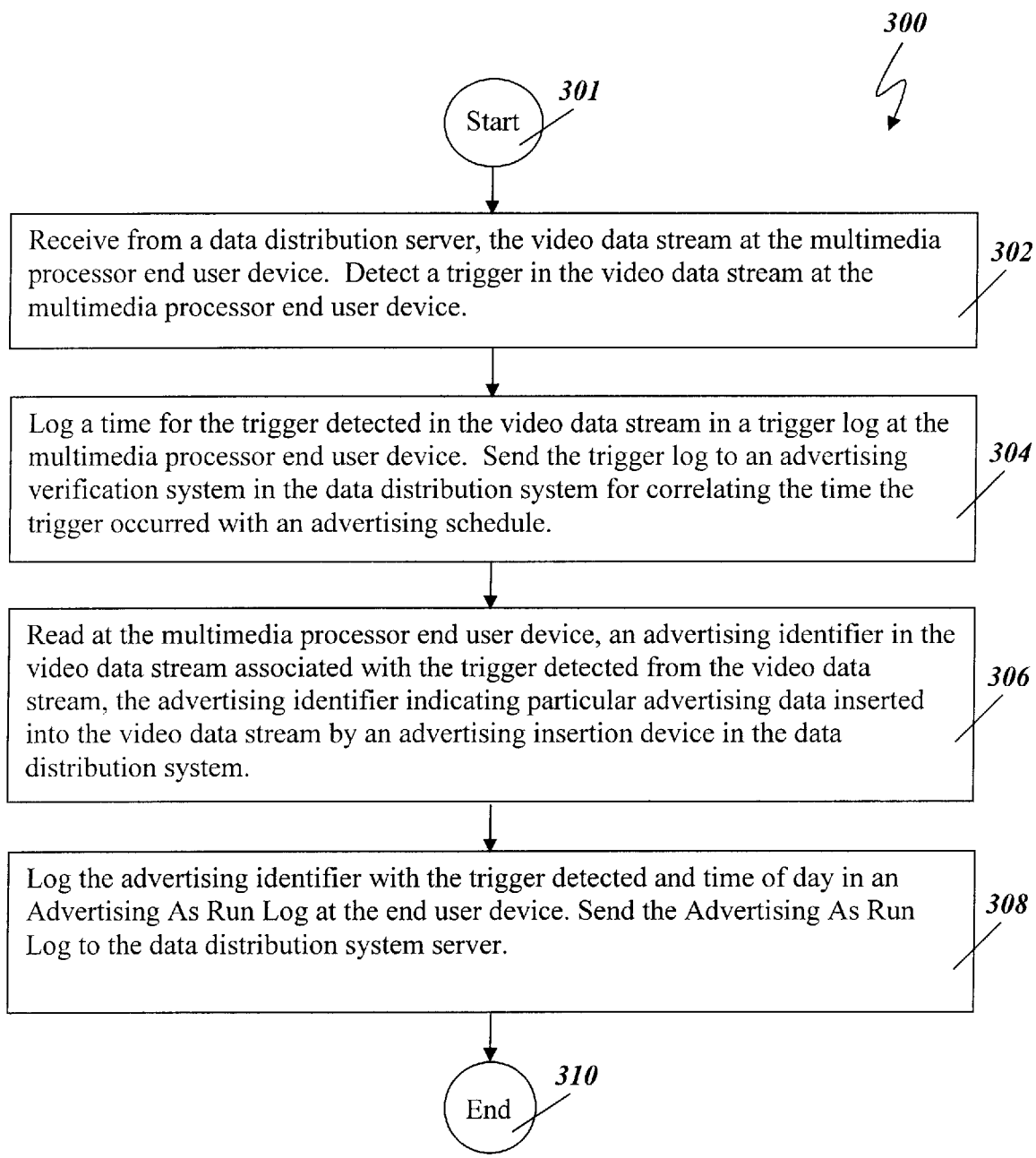
FIG. 3 depicts a flow chart of functions performed in an illustrative embodiment for delivering advertising data.

Turning now to FIG. 3, a flow chart 300 of functions performed in a particular illustrative embodiment is shown. The flow chart is exemplary only and does not imply or dictate an order of execution or functions to be performed, as other embodiments may perform only some of the functions or other functions entirely and not necessarily in the order shown in FIG. 3. The flow chart 300 begins at terminal 301 and proceeds to block 302 in which an illustrative embodiment receives from a data distribution server, the video data stream at the multimedia processor end user device and detects a trigger in the video data stream at the multimedia processor end user device. The flow chart then proceeds to block 304 in which an illustrative embodiment logs a time for the trigger detected in the video data stream in a trigger log data base at the multimedia processor end user device and sends the trigger log data base an advertising verification system 104 in the data distribution system for correlating the time the trigger occurred with an Advertising Schedule.

The flow chart then proceeds to block 306 in which an illustrative embodiment reads at the multimedia processor end user device, an advertising identifier in the video data stream associated with the trigger detected from the video data stream, the advertising identifier indicating particular advertising data inserted into the video data stream by an advertising insertion device in the data distribution system. The flow chart then proceeds to block 306 in which an illustrative embodiment 308 logs the advertising identifier with the trigger detected and time of day in an As Run data base at the end user device and sends the As Run data base to the data distribution system server.

Figure 4:
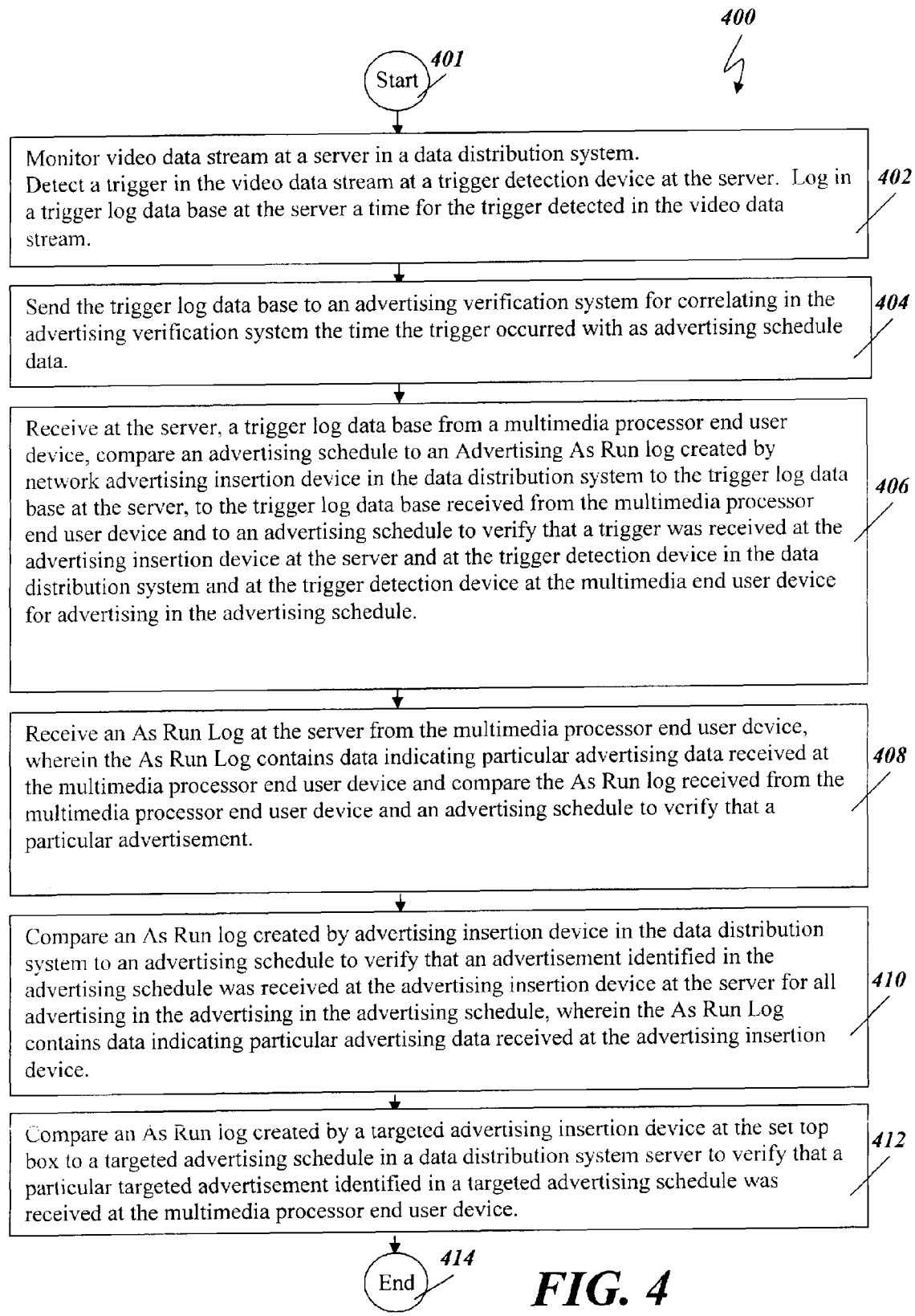
FIG. 4 depicts a flow chart of functions performed in another illustrative embodiment for delivering advertising data.

Turning now to FIG. 4, a flow chart 400 of functions performed in a particular illustrative embodiment is shown. The flow chart is exemplary only and does not imply or dictate an order of execution or functions to be performed, as other embodiments may perform only some of the functions or other functions entirely and not necessarily in the order shown in FIG. 4. The flow chart 400 begins at terminal 401 and proceeds to block 402 in which an illustrative embodiment monitors a video data stream at a server in a data distribution system. An illustrative embodiment detects an advertising trigger in the video data stream at a trigger detection device at the server and logs the trigger in a trigger log data base at the server a time for the trigger detected in the video data stream. At block 404 an illustrative embodiment sends the trigger log data base to an advertising verification system for correlating in the advertising verification system the time the trigger occurred with as Advertising Schedule data. At block 406 an illustrative embodiment receives at the server, a trigger log data base from a multimedia processor end user device, and compares an Advertising Schedule to an As Run log created by network advertising insertion device in the data distribution system to the trigger log data base at the server, to the trigger log data base received from the multimedia processor end user device and to an Advertising Schedule to verify that a trigger was received at the advertising insertion device at the server and at the trigger detection device in the data distribution system and at the trigger detection device at the multimedia end user device for advertising in the Advertising Schedule. The As Run Log contains data indicating particular advertising data inserted by the advertising insertion device in the data distribution system.

At block 408 an illustrative embodiment receives an As Run Log at the server from the multimedia processor end user device, wherein the As Run Log contains data indicating particular advertising data received at the multimedia processor end user device and compares the As Run log received from the multimedia processor end user device and an Advertising Schedule to verify that a particular advertisement was run. At block 410 an illustrative embodiment compares an As Run log created by advertising insertion device in the data distribution system to an Advertising Schedule to verify that an advertisement identified in the Advertising Schedule was received at the advertising insertion device at the server for all advertising in the advertising in the Advertising Schedule. In a particular embodiment the As Run Log contains data indicating particular advertising data received at the advertising insertion device. At block 412 an illustrative embodiment compares an As Run log created by a targeted advertising insertion device at the set top box to a targeted Advertising Schedule in a data distribution system server to verify that a particular targeted advertisement identified in a targeted Advertising Schedule was received at the multimedia processor end user device. At terminal 414 the functions of the particular illustrative embodiment as shown in FIG. 4 end.

Figure 5:
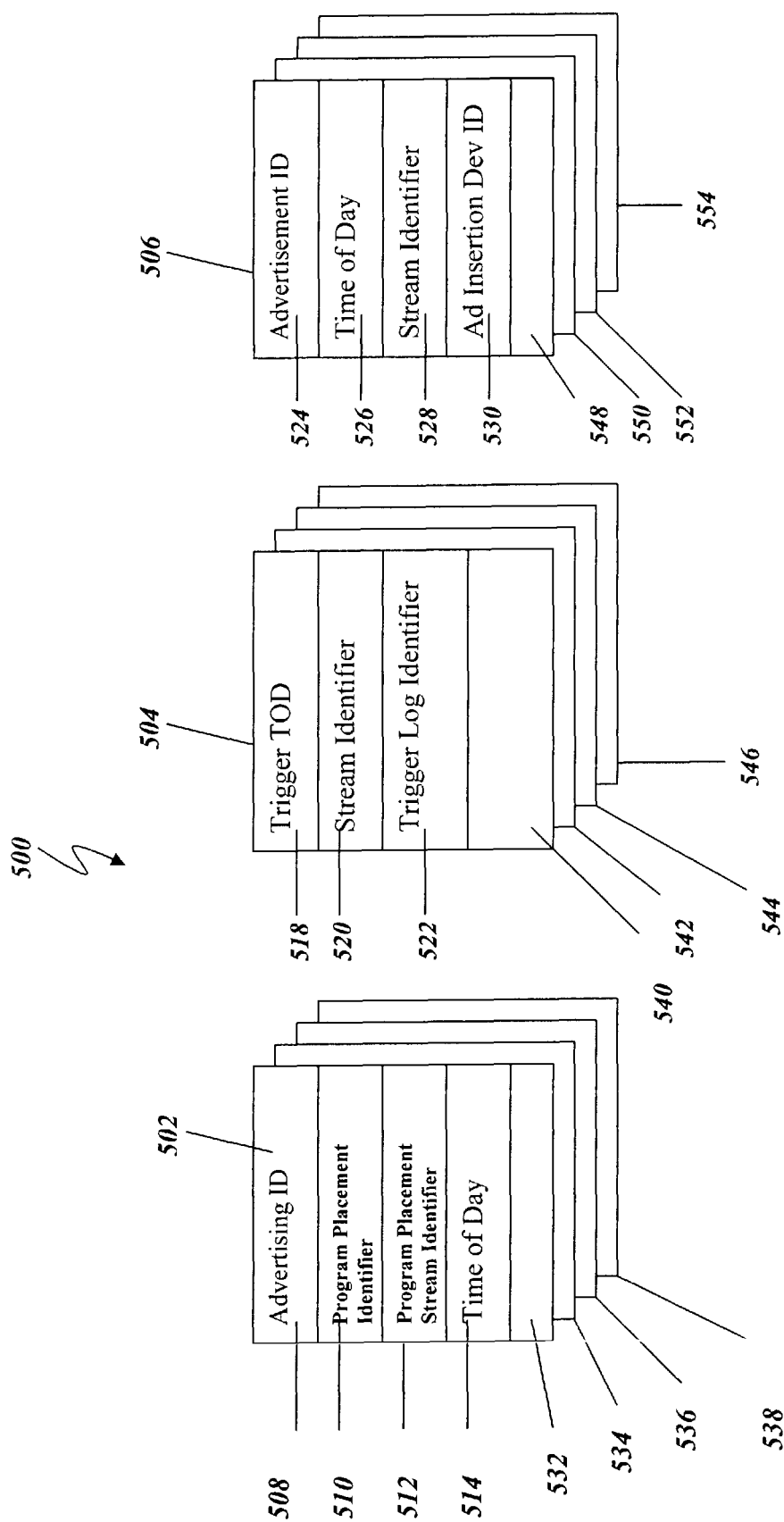
FIG. 5 depicts a data structure embedded in a computer readable medium in an illustrative embodiment.

Turning now to FIG. 5, in a particular illustrative embodiment data structures 500 embedded in a computer readable medium are provided. The data structures 500 include fields for storing data used by an illustrative embodiment of a system, computer program product and method. There are three main data structures and Advertisement Schedule (AS) 502, Trigger Log (TL) 504 and As Run Log (ARL) 506 which are stored at each level in the ITPV network (national, regional, local and targeted (individual/small group) and STB). An AS data 502 structure is created in composite pieces as a data structure for each level national 532, regional 534, local 536 and targeted 538 and STB 539. Each AS data structure includes but is not limited to a first field 508 for storing data indicating an advertisement identifier. In a particular embodiment the advertisement identifier is an ISCI code. The AS data structure further includes but is not limited to a program placement identifier 510 for identifying a program, such as the "SUPER BOWL™" in which the advertisement identified by the advertising identifier 508 is to be placed. The AS data structure further includes but is not limited to a program placement stream identifier 512 for identifying a video stream in which a program, such as the "SUPER BOWL™" in which the advertisement identified by the advertising identifier 508 is to be placed. The AS data structure further includes but is not limited to a time of day 514 for identifying a time of day at which the advertisement identified by the advertising identifier 508 is to be placed the program identified in the program placement identifier.

A Trigger Log 504 aggregate data structure is created in composite pieces as a data structure for each level, national 540, regional 542, local 544 and targeted 546 and STB 437. Each level TL data structure includes but is not limited to a first field 518 for storing data indicating a trigger time of day at which the trigger was identified. The TL data structure further includes but is not limited to a stream identifier 520 for identifying a video data stream, in which the trigger was identified. The TL data structure further includes but is not limited to a trigger log device identifier (TLD ID) 522 for identifying the TLD at which the trigger was detected.

An As Run Log (ARL) 506 data structure is created in composite pieces as a data structure for each level national 548, regional 550, local 552, targeted 554 and STB 555. Each ARL data structure includes but is not limited to a first field 524 for storing data indicating an advertising identifier for an advertisement detected in association with a trigger time of day and stream ID in the TL. The TL further includes but is not limited to a Time of Day (TOD) field 526 for storing data indicating an advertisement time of day at which the advertisement was identified. The TL data structure further includes but is not limited to a stream identifier 528 for identifying a video data stream, in which the advertisement was identified. The TL data structure further includes but is not limited to an advertising insertion device identifier (AID ID) 522 for identifying the AID at which the trigger was detected.

Figure 6:
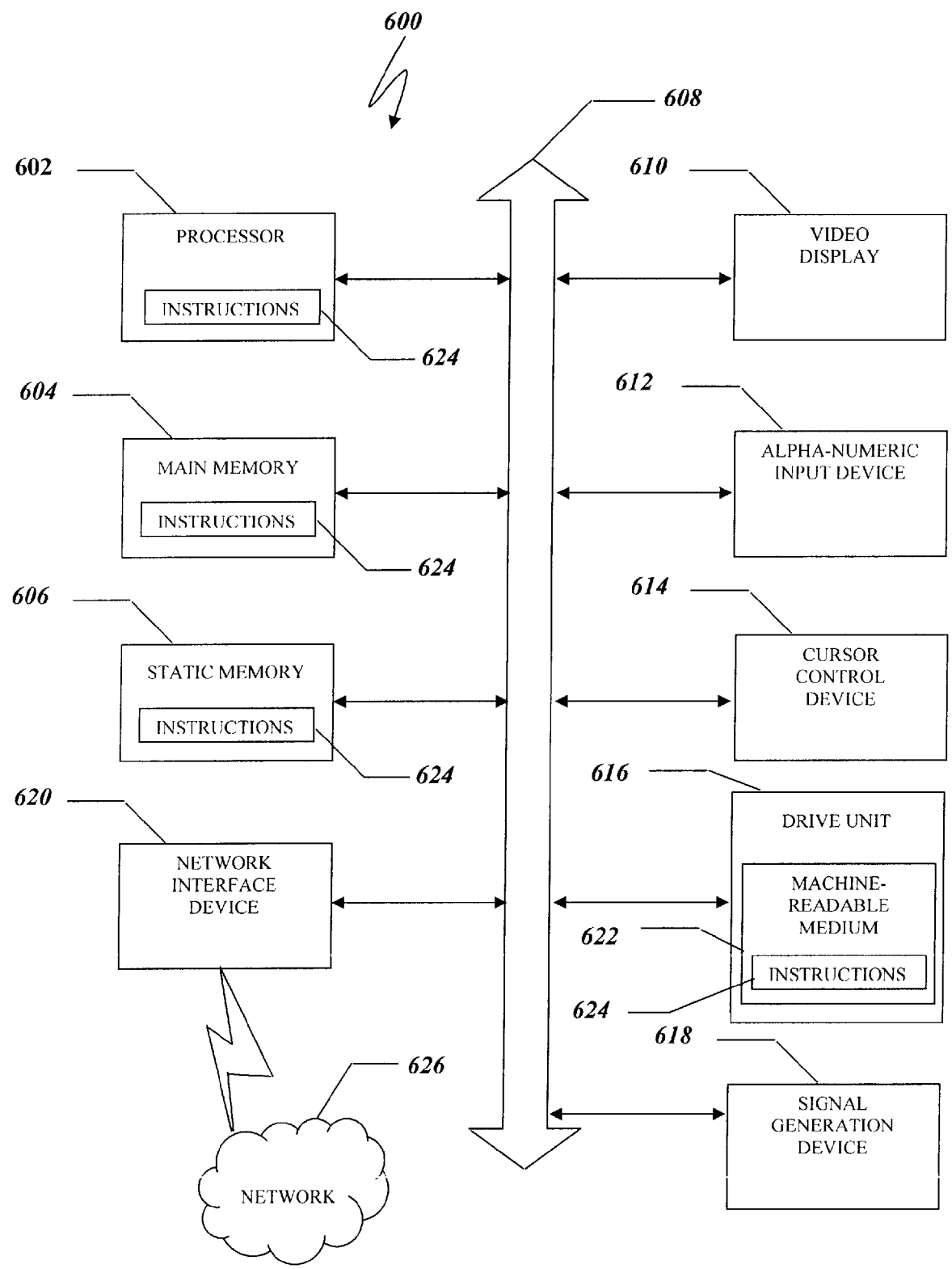
FIG. 6 is an illustrative embodiment of a machine for performing functions disclosed in an illustrative embodiment.

FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystals display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface.

The disk drive unit 616 may include a machine-readable and computer-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable and computer-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 624, or that which receives and executes instructions 624 so that a device connected to a network environment 626 can send or receive voice, video or data, and to communicate over the network 626 using the instructions 624. The instructions 624 may further be transmitted or received over a network 626 via the network interface device 620. The machine readable medium may also contain a data structure for containing data useful in providing a functional relationship between the data and a machine or computer in an illustrative embodiment of the disclosed system and method.

While the machine-readable and computer-readable medium 622 is shown in an example embodiment to be a single medium, the term "machine-readable and computer-readable medium" should be taken to include a single medium or multiple media (e.g., a centralized or distributed database, and/or associated caches and servers) that store the one or more sets of instructions. The term "machine-readable and computer-readable medium" shall also be taken to include any medium that is capable of storing, encoding or carrying a set of instructions for execution by the machine and that cause the machine to perform any one or more of the methodologies of the present invention. The term "machine-readable and computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable and computer-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for logging triggers in a video data stream the method comprising:
  monitoring a video content data stream at a multimedia processor end user device;
  receiving from a data distribution server, the video data stream at the multimedia processor end user device;
  detecting presence of a trigger, an advertising identifier and an indicator in the video content data stream at the multimedia processor end user device as the video content data stream is being watched by an end user;
  if the indicator is present and indicates that an advertisement is to be inserted, inserting the advertisement identified by the advertising identifier into the video data stream, else if the indicator is present and indicates the advertisement is already inserted, not inserting the advertisement into the video data stream;
  logging the advertisement identified by the advertising identifier and a time for the trigger detected in the video data stream in a trigger log at the multimedia processor end user device;
  and
  sending the trigger log to an advertising verification system so that the advertising verification system can correlate the advertising identifier and the time the trigger occurred with a local, regional and national advertising schedule.

2. The method of claim 1, wherein the detecting further comprises scanning the first 20 lines of video data stream for the trigger.

3. The method of claim 1, further comprising:
- reading at the multimedia processor end user device, an advertising identifier in the video data stream associated with the trigger detected from the video data stream, the advertising identifier indicating particular advertising data inserted into the video data stream by an advertising insertion device in the data distribution system;
- logging the advertising identifier with the trigger detected and time of day in an As Run Log at the end user device; and
- sending the As Run Log to the data distribution system server.

4. The method of claim 3, wherein the advertising identifier is an international standard code identifier (ISCI) code assigned to the advertising data and inserted into the video data stream in the data distribution system server.

5. The method of claim 1, wherein the trigger is a Society for Cable Television Engineers (SCTE) 104 trigger and the video data stream is a SDI video data stream.

6. The method of claim 1, wherein the trigger is a SCTE 35 trigger and the video data stream is an ASI video data stream.

* * * * *